(12) United States Patent
Canham

(10) Patent No.: US 7,915,525 B2
(45) Date of Patent: Mar. 29, 2011

(54) LIGHTNING DIRECTING SYSTEM

(75) Inventor: John S. Canham, Ellicott City, MD (US)

(73) Assignee: Alliant Techsystems Inc., Minneapolis, MN (US)

( * ) Notice: Subject to any disclaimer, the term of this patent is extended or adjusted under 35 U.S.C. 154(b) by 222 days.

(21) Appl. No.: 12/391,383

(22) Filed: Feb. 24, 2009

(65) Prior Publication Data

US 2010/0212925 A1 Aug. 26, 2010

(51) Int. Cl.
*H02G 13/00* (2006.01)
(52) U.S. Cl. ........... 174/2; 174/3; 174/6; 174/7; 174/51; 361/117; 439/92
(58) Field of Classification Search .................. 174/2, 3, 174/6, 7, 51; 361/117; 439/92, 98, 100
See application file for complete search history.

(56) References Cited

U.S. PATENT DOCUMENTS

| | | | | |
|---|---|---|---|---|
| 5,741,167 | A * | 4/1998 | Hagerty | 441/13 |
| 7,495,168 | B2 * | 2/2009 | Park | 174/7 |
| 7,655,861 | B2 * | 2/2010 | Duley | 174/6 |

OTHER PUBLICATIONS

Lalande, P. et al., "Connection to Ground of an Artificially Triggered Negative Downward Stepped Leader". 10$^{th}$ International Conference on Atmospheric Electricity, 1996, pp. 668-671.
Willett, John C. et al., "Triggered Lightning Risk Assessment for Reuseable Launch Vehicles at the Southwest Regional and Oklahoma Spaceports". Jan. 29-Feb. 2, 2006, Paper No. 8.9, 12$^{th}$ Conference on Aviation, range, and Aerospace Meteorology, American Meteorological Society.

* cited by examiner

*Primary Examiner* — Dhiru R Patel
(74) *Attorney, Agent, or Firm* — IPLM Group, P.A.

(57) ABSTRACT

A lightning direction device is provided. The lightning direction device includes a drag member, a pendant mass and a conductor. The drag member is configured to have a select amount of wind resistance. The pendant mass has a select weight and shape. Moreover, the conductor is coupled between the pendant mass and the drag member.

24 Claims, 4 Drawing Sheets

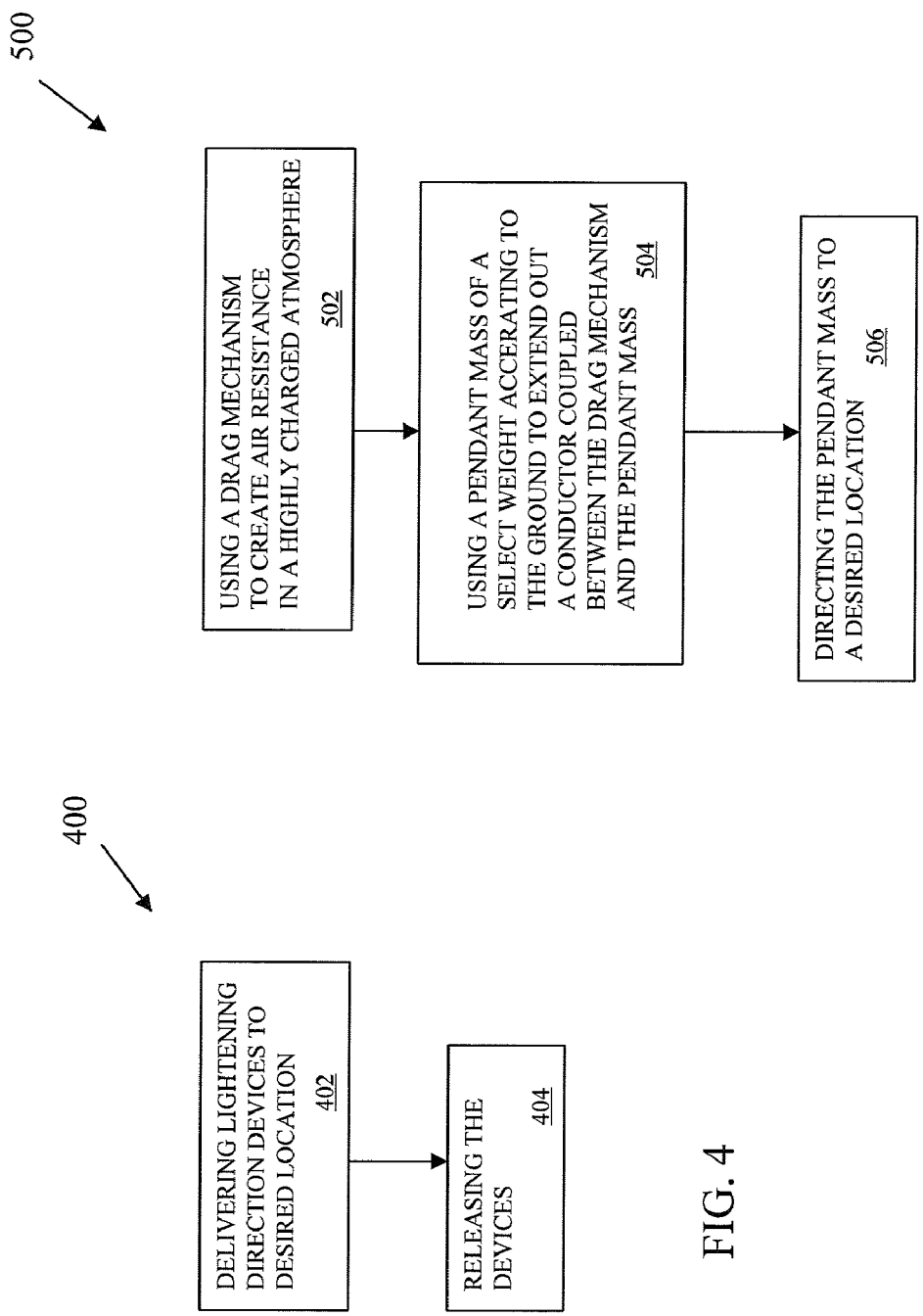

LIGHTNING DIRECTING SYSTEM

BACKGROUND

An average lightning strike can produce 500 mega joules of energy and can heat up a strike area to 10,000° C. The ability to direct lightning strikes to a desired location has been sought out for scientific and military applications. A relatively modern technique used in lightning research is the use of a sounding rocket to drag a grounded wire up to a highly charged region in the atmosphere. Although limited success has been achieved in directing a strike with this technique, it results in the lightning strike coming back to the initiator's location. Hence, this technique has little is any beneficial application in a military situation.

For the reasons stated above and for other reasons stated below which will become apparent to those skilled in the art upon reading and understanding the present specification, there is a need in the art for an effective and efficient method of controlling lightning strikes.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a lightning direction device is provided. The lightning direction device includes a drag member, a pendant mass and a conductor. The drag member is configured to have a select amount of wind resistance. The pendant mass has a select weight and shape. Moreover, the conductor is coupled between the pendant mass and the drag member.

BRIEF DESCRIPTION OF THE DRAWINGS

The present invention can be more easily understood and further advantages and uses thereof more readily apparent, when considered in view of the detailed description and the following figures in which:

FIG. 4, is a delivery flow diagram of a ballistic object lightning targeting system of one embodiment of the present invention; and FIG. 5, is an application flow diagram of a ballistic object lightning targeting system of one embodiment of the present invention.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide a method of controlling lightning strikes that are away from the initiator. Hence, embodiments can be used in military applications directing lightning strikes on an enemy. Tactically, utilizing the inherent energy of the environment minimizes a mass and equipment ratio, providing a bigger bang for the buck and greater effect capacity per fielded mass. Moreover, the use of lightning strikes on an enemy provides an element of surprise. The enemy will be expecting projectiles and explosives not multiple directed lightning strikes as provided with the present invention. Besides the physical damage inflicted by the lightning strikes, embodiments will provide a potentially significant psychological effect on the enemy. Besides military applications, embodiments can be used for any application requiring the directing of lightning or the depletion of charge in the atmosphere.

Figure 1:
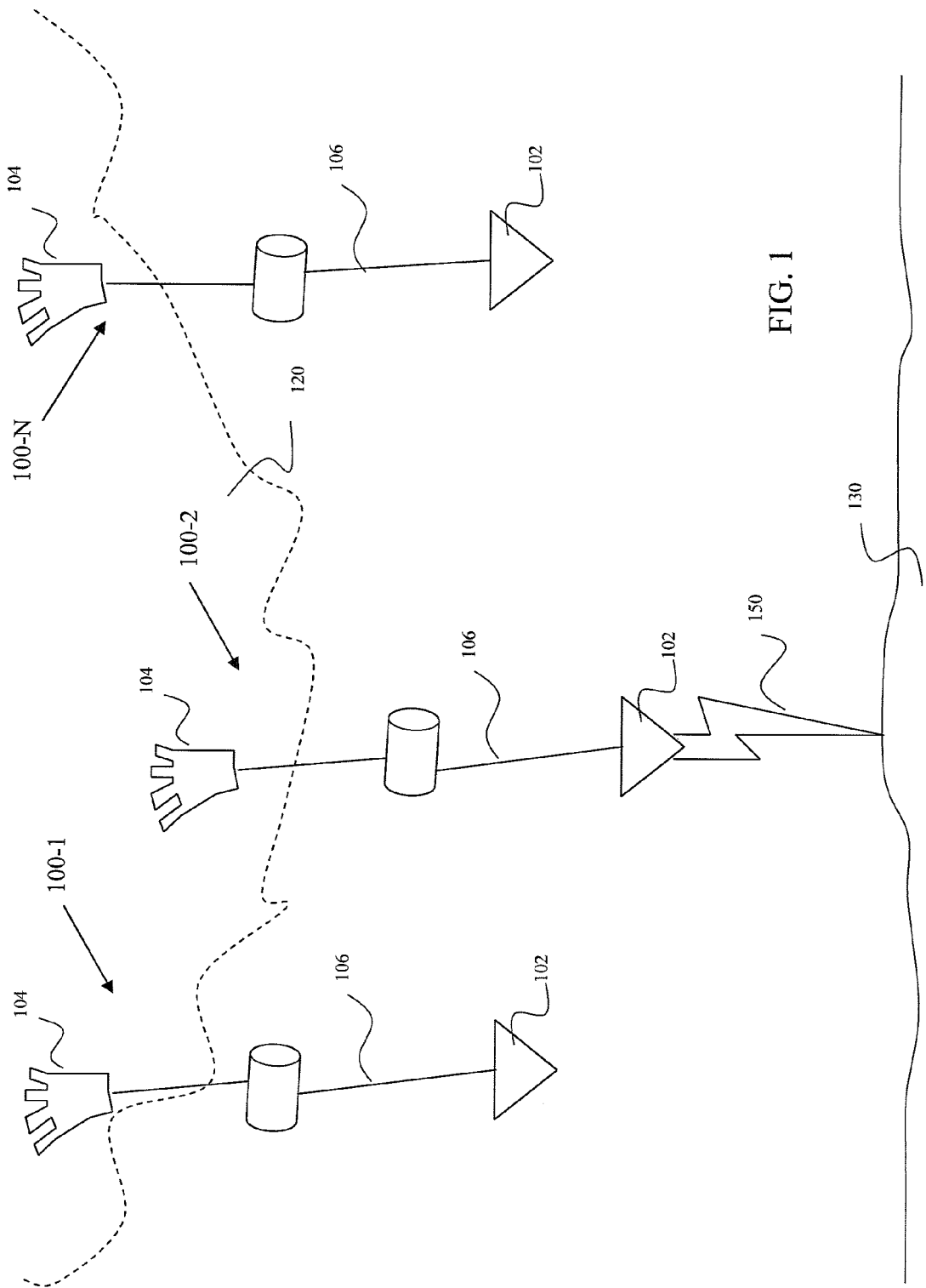
FIG. 1 is an illustration of a ballistic object lightning targeting system of one embodiment of the present invention.

Embodiments of the present invention use an ungrounded conductor with a suitable drag member and pendant mass that is guided in some embodiments and unguided in other embodiments. Referring to FIG. 1, an illustration of a lightning direction system including a plurality of lightning directing devices 100-1 through 100-N of one embodiment is provided. In this embodiment, a plurality of lightning directing devices 100-1 through 100-N are released in a highly charged atmosphere 120 to fall to the ground 130. Hence, in embodiments more than one lightning directing device 100-1 through 100-N can be used. For simplicity, the plurality of lightning directing devices 100-1 through 100-N is hereinafter generally referred to as devices 100. As illustrated in FIG. 1, in this embodiment, each of the devices 100 includes a drag member 104, a conductor 106 and a pendant member 102. The drag member 104 functions to slow an upper portion of a device 100 to maintain the upper portion of the device 100 in the highly charged atmosphere 120 of an electrical storm. The drag member 104 of the embodiment of FIG. 1 is a drag chute 104. The conductor 106 is coupled to the drag member 104 as illustrated in FIG. 1. In one embodiment, the conductor 106 is ungrounded wire. Further in one embodiment, the conductor has a length of approximately between 500 to 1000 meters. Air breaks down as an insulator at about 25 thousand V/cm. In use, as the pendant 102 gets close the ground 130, a voltage potential difference of approximately a million volts between the pendant 102 and ground 130 is created that will result in the generation of a lighting strike 150. In particular, the proximity of the pendant 102 to the ground 130 and the potential difference between the two will result in the vaporization and ionization of the conductor 106 and the establishment of an initial lightning strike 150. The initial lighting strike will be followed by typically a significantly larger second lightning strike 150. Hence, in embodiments, the pendant 102 does not have to reach the ground 130 for a lightning strike 150 to occur as illustrated in FIG. 1. The term ground 130 is generally used to refer to solid earth as well bodies of water.

In the embodiment of FIG. 1, the pendant member 102 is merely an unguided mass. The pendant mass is of sufficient weight and shape that it accelerates towards the ground 130. The difference between the rate of acceleration of the pendant mass 102 and the drag member 104 causing the conductor 106 to extend out between the pendant mass 102 and the drag member 104. The devices 100 are positioned by either dropping them from an aircraft or delivering them with the use of a missile or the like launched from the ground into the highly charged atmosphere 120. In one embodiment, the devices 100 are positioned above the highly charged atmosphere by plane or missile and then allowed to fall down into the highly charged atmosphere 120. In this unguided mass embodiment, the pendant member 102 is directed to a desired location based on its initial placement and its falling characteristics. Hence, to achieve a desired placement of a lightning direction device 100 of this embodiment, the falling characteristics of the device 100 must first be known. The falling characteristics include how fast the device 100 will fall and what is the drag coefficient of the drag member 104. Once, the falling characteristics are determined, an initial location placement position can be determined to achieve a desired positioning outcome. Although, the accuracy may have it limits, this embodiment, however, has advantages. Mainly, the devices 100 are relatively inexpensive to make. Hence, a plurality of devices 100 can be dropped from a plane for very little money. In addition, in an application where it is desirable to deplete the charge in the atmosphere, a large number of lightning directing devices 100 could be used.

Figure 2:
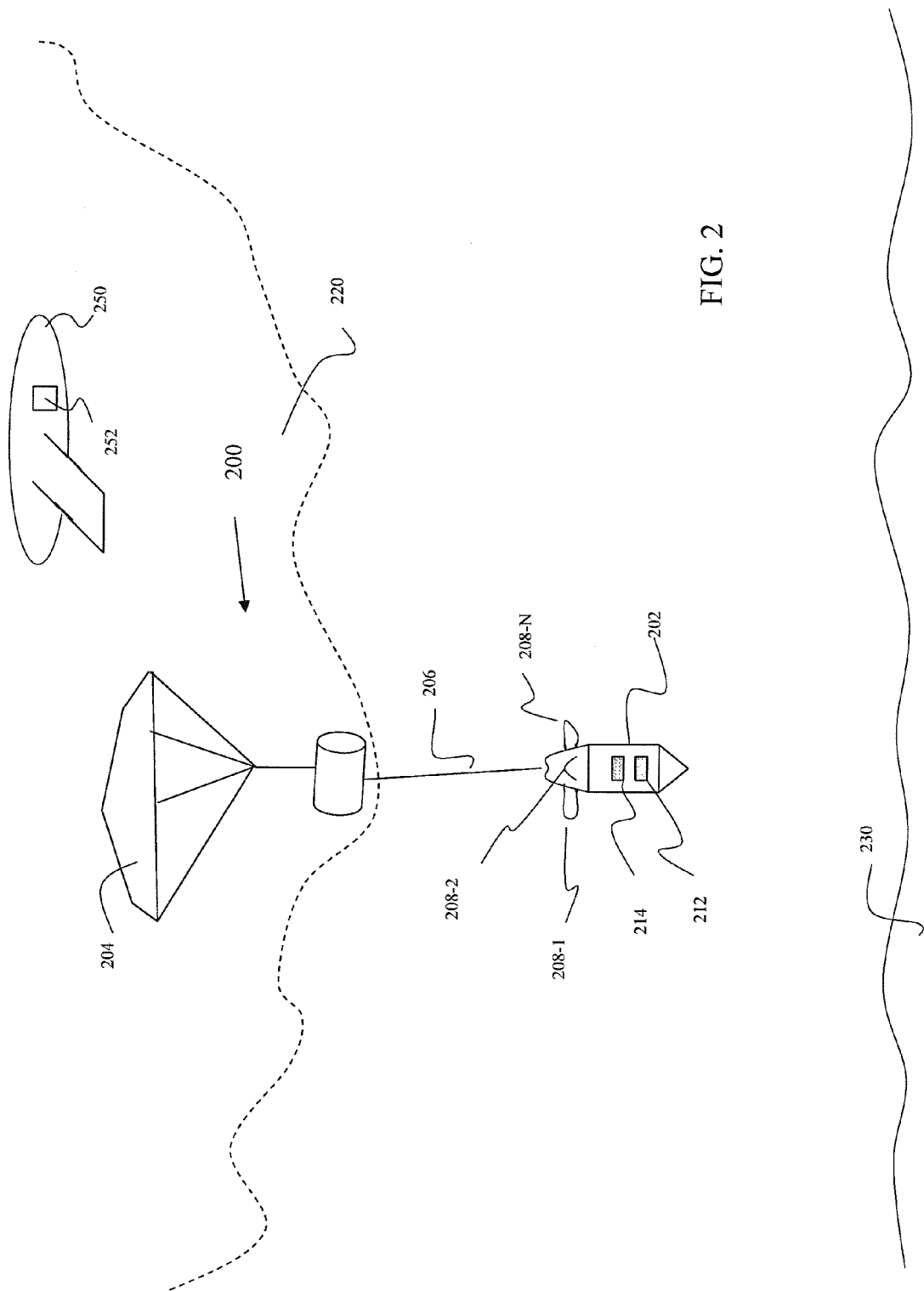
FIG. 2 is an illustration of another ballistic object lightning targeting system of one embodiment of the present invention.

Referring to FIG. 2, an illustration of another embodiment is illustrated. In this embodiment the lightning directing device 200 includes a drag member 204, a conductor 206 and a pendant mass 202. The device is illustrated as falling from a highly charged atmosphere 220 to the ground 230. The drag member 204 in this embodiment is a parachute 204. The pendant mass 202 in this embodiment is guided by manipulating a control surface, such as fins 208-1 through 208-N, of the pendant mass 202. In one embodiment, a global positioning system (GPS) 212 is used to provide directions and a controller 214 is used to control fins 208-1 through 208-N based on a signal from the GPS 212. In this embodiment, the pendant mass 202 needs to be large enough to achieve sufficient velocity when falling so the control surfaces 208-1 through 208-N have sufficient effect to direct the device. An example, of a device capable of providing guidance is a precision guidance kit (PKG) that is attached to a pendant mass. Also illustrated, in FIG. 2 is the delivery device 250 such as but not limited to an un-manned aircraft. In one embodiment, the delivery device 250 includes electric field sensors 252 that allow the delivery device 250 to determine the best location (sufficiently charged atmosphere) to drop the lightning directing device 200. Other type of guidance systems beside the GPS 212 are contemplated, including inertial guidance systems 212 and the like.

Figure 3:
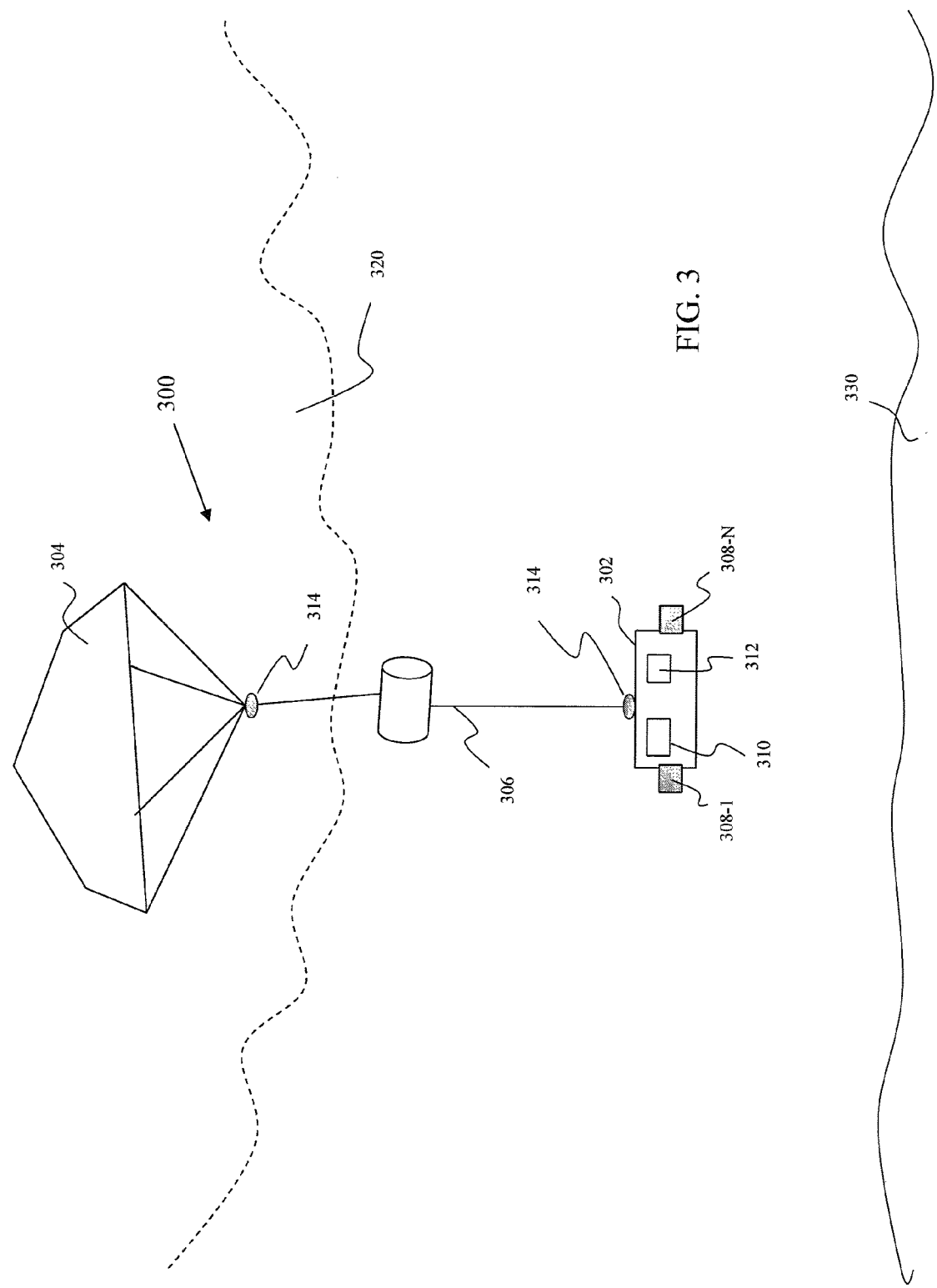
FIG. 3, is an illustration of yet another ballistic object lightning targeting system of one embodiment of the present invention.

Referring to FIG. 3, yet another embodiment of a lightning direction device 300 is illustrated. In this embodiment, the lightning directing device 300 includes a drag member 304, a conductor 306 and a pendant mass 302. The device 300 is illustrated as falling from a highly charged atmosphere 320 to the ground 330. The drag member 304 in this embodiment is a parachute 304. The pendant mass 302 in this embodiment is propulsion driven. In particular, this embodiment of the pendant 302 includes propulsion units 308-1 through 308-N that are used to direct the device 300 to a desired location. The pendant mass 302 includes a guidance system 310 and a controller 312. The controller 312 controls propulsion units 308-1 through 308-N based on signals from the guidance system 310. Other types of engines or devices are contemplated to move the pendant masses 102, 202 or 302 in the air and the present invention is not limited to the examples proved above. In one embodiment, plasma contactors 314 are used as illustrated in the embodiment of FIG. 3 to provide better coupling between the drag member 304 and the pendant 302. In this embodiment the coupling of more energy into the initiated discharge is achieved by equalizing the local charge of the environment. The effect of using plasma contactors 314 is similar to creating a larger chargeable surface at the top of the lightning direction device 100, 200 or 300 without increasing the detect-ability of the system 100, 200 or 300.

Referring to FIG. 4 a delivery flow diagram 400 of one embodiment is illustrated. In this embodiment, the lightning direction devices, such as devices 100, 200 and 300 described above, are delivered to a desired location (402). The desired location is a location with a sufficiently charged atmospheric region that has a usable charge source. This is generally referred to herein as a highly charge atmosphere. Charge generation can be the result of particles (such as water, ice and dust) moving or the result of sufficient thermal gradients. There are many ways to deliver the lightening direction devices, including but not limited to, by a manned aircraft, by an unmanned aircraft, by a missile and the like as discussed above. Missile delivery can include guided missiles, unguided missiles, rockets, projectiles and the like. Moreover, as discussed above, in regards to the embodiment of FIG. 2, the delivering device 250 may include electric field sensors 252 to detect a highly charged atmosphere to pinpoint a good location for release. Once the lightning direction devices are in the desired release location, they are released (404).

FIG. 5 illustrates an application flow diagram 500 of one embodiment. As illustrated, in one embodiment a drag member is used create air resistance in the highly charged atmosphere (502). Examples of drag members are drag chute 104 of FIG. 1 and parachute 204 of FIG. 2. In other embodiments, the drag members include lighter than air devices such as balloons and dirigible. Still in other embodiments a small unmanned remote controlled flying vehicle is used as the drag member. Hence, in this embodiment, the drag member can also be the delivery means. A pendant mass accelerates towards the ground (504). The difference in the rate of acceleration of the drag member falling to the ground and the rate of acceleration of the pendant mass falling to the ground extends out (or spools out or plays out) a conductor that is coupled between them. Examples of pendant masses include pendant masses 102, 202 and 302 as described above. The conductor is typically a wire made from any type of conductive material. In one embodiment plasma contactors provides coupling between the drag member, the pendant mass and the conductor. Further in one embodiment the pendant mass is directed to a desired location (506). Examples of lightning directing systems 200 and 300 that have pendant masses that are directed to specific locations are pendant masses 202 and 302 described above.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:
1. A lightning direction device configured to be placed in a highly charged atmosphere, the lighting direction device comprising:
    a drag member configured to have a select amount of wind resistance;
    a pendant mass having a select weight and shape; and a conductor coupled between the pendant mass and the drag member.

2. The lightning direction device of claim 1, wherein the drag member is one of a drag chute, a parachute, a lighter than air device and a remote controlled flying device.

3. The lightning direction device of claim 1, wherein the pendant mass further comprises:
a guiding mechanism.

4. The lightning direction device of claim 1, wherein the pendant mass further comprises:
at least one adjustable surface;
a controller configured to manipulate the at least one surface; and
a guidance system in communication with the controller, wherein the controller manipulates the at least one adjustable surface based on a signal from the guidance system to direct the pendant mass to a desired location.

5. The lighting direction device of claim 4, wherein the guidance system is at least one of a global positioning system (GPS) and an inertial guidance system.

6. The lightning direction device of claim 1, further comprising:
plasma contactors coupling the conductor to at least one of the drag member and the pendant mass.

7. The lightning direction device of claim 1, further comprising;
a propulsion system configured to direct the pendant mass to a desired location.

8. The lightning direction device of claim 1, wherein the conductor is a conductive wire.

9. The lightning direction device of claim 8, wherein the wire has a length between 500 to 1000 meters.

10. A lightning directing system comprising:
a plurality of lightning directing devices configured to drop from a highly charged atmosphere, each lightning directing device including,
a drag member configured to have a select amount of wind resistance,
a pendant mass having a select weight, and
a conductor coupled between the pendant mass and the drag member.

11. The lightning directing system of claim 10, wherein the drag member of at least one of the lightning directing devices is one of a drag chute, a parachute, a lighter than air device and a remote controlled flying device.

12. The lightning directing system of claim 10, wherein the pendant mass of at least one lightning directing device further comprises:
a guiding mechanism configured to guide the pendant mass to a desired location.

13. The lightning directing system of claim 12, wherein the guiding mechanism further comprises:
at least one adjustable surface;
a controller configured to manipulate the at least one surface; and
a guidance system in communication with the controller, wherein the controller manipulates the at least one adjustable surface based on a signal from the guidance system to direct the pendant to a desired location.

14. The lighting direction system of claim 13, wherein the guidance system is at least one of a global positioning system (GPS) and an inertial guidance system.

15. The lightning directing system of claim 10, wherein at least one of the lightning directing devices further comprises:
plasma contactors coupling the conductor to at least one of the drag member and the pendant.

16. A method of directing lightning, the method comprising:
positioning an ungrounded conductor of at least one lightning directing device in a highly charged atmosphere, wherein the conductor of each lightning directing device is coupled between a pendant mass and a drag member.

17. The method of claim 16, wherein positioning the ungrounded conductor of the lightning directing device in the highly charged atmosphere further comprises: dropping the at least one lightning directing device in the atmosphere.

18. The method of claim 17, wherein dropping the at least one lightning directing device in the atmosphere, further comprises:
dropping the at least one lightning directing device in the atmosphere from an aircraft.

19. The method of claim 18, wherein the aircraft is an unmanned aircraft.

20. The method of claim 16, further comprising:
sensing an electric field strength in the atmosphere with a delivery device.

21. The method of claim 16, wherein positioning the ungrounded conductor of the lightning directing device in the highly charged atmosphere further comprises: delivering the at least one lightning directing device with a missile.

22. The method of claim 16, further comprising:
guiding the pendant mass of the at least one lightning directing device to a desired location.

23. The method of claim 22, wherein guiding the pendant mass of the at least one lightning directing device to a desired location further comprises:
manipulating at least one guide surface based on signals from a guidance system.

24. The method of claim 22, wherein guiding the mass pendant of the at least one lightning directing device to a desired location further comprises:
selectively engaging at least one propulsion unit based on signals from a guidance system.

* * * * *

UNITED STATES PATENT AND TRADEMARK OFFICE
CERTIFICATE OF CORRECTION

| | | |
|---|---|---|
| PATENT NO. | : 7,915,525 B2 | Page 1 of 1 |
| APPLICATION NO. | : 12/391383 | |
| DATED | : March 29, 2011 | |
| INVENTOR(S) | : John S. Canham | |

It is certified that error appears in the above-identified patent and that said Letters Patent is hereby corrected as shown below:

FIGURE 4, Box 402: "DELIVERING LIGHTENING DIRECTION DEVICES TO DESIRED LOCATION" Should read --DELIVERING LIGHTNING DIRECTION DEVICES TO DESIRED LOCATION--.

Column 1, Line 14: "...has little is any beneficial..." should read --...has little if any beneficial...--.

Column 2, Line 56: "The initial lighting strike will be" should read --The initial lightning strike will be--.

Column 2, Line 61: "...solid earth as well bodies..." should read --...solid earth as well as bodies...--.

Column 4, Line 14: "charge" should read --charged--.

Column 4, Line 30: "is used create..." should read --is used to create...--.

Column 4, Line 34: "dirigible" should read --dirigibles--.

Column 4, Line 63, Claim 1, line 2: "lighting" should read --lightning--.

Column 5, Line 18, Claim 5, line 1: "lighting" should read --lightning--.

Column 6, Line 8, Claim 14, line 1: "lighting" should read --lightning--.

Signed and Sealed this
Thirty-first Day of May, 2011

David J. Kappos
*Director of the United States Patent and Trademark Office*